3,098,073
UNSYMMETRICAL N,N'-(N,N-DISUBSTITUTED AMINOALKYL)-HYDRAZINES
John H. Biel, Milwaukee, Wis., assignor, by mesne assignments, to Lakeside Laboratories, Inc., Milwaukee, Wis., a corporation of Delaware
No Drawing. Filed Jan. 13, 1960, Ser. No. 2,123
8 Claims. (Cl. 260—247.5)

This invention relates to the production of N,N'-disubstituted hydrazines. More particularly, this invention is concerned with novel unsymmetrical N,N'-(N,N-disubstituted aminoalkyl)-hydrazines and processes of preparing such compounds.

This application is a continuation-in-part of my copending application Serial No. 699,517, filed November 29, 1957, and now abandoned.

According to the present invention there are provided novel unsymmetrical N,N'-(N,N-disubstituted aminoalkyl)-hydrazines and hydrazones of the formulae

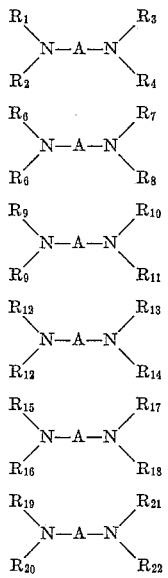

as well as acid addition salts and quaternary ammonium salts thereof, wherein A is a member of the group consisting of $$-(CH_2)_m-NH-N=CH-(CH_2)_n-$$

and

wherein $m$ is an integer from 2 to 10, $n$ is an integer from 1 to 9, $R_5$ is a member of the group consisting of hydrogen and lower alkyl groups, and $R_1$ and $R_2$ represent members of the group consisting of lower alkyl, phenyl, phenyl-lower alkyl, monocyclic alkyl, lower alkenyl and lower alkynyl, and

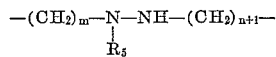

represent nonidentical members of the group consisting of morpholino, pyrrolidino, piperidino, 1,2,3,4-tetrahydroisoquinolino, 1,2,3,4-tetrahydroquinolino, isoindolino, 4-lower alkyl-1-piperazino, 3-hydroxypiperidino, 4-hydroxypiperidino, indolino, theophyllino and phenothiazino, $R_6$ is lower alkyl, $R_7$ and $R_8$ are members of the group consisting of phenyl, phenyl-lower alkyl, monocyclic alkyl, lower alkenyl, lower alkynyl and lower alkyls, at least one of said lower alkyls being different than the lower alkyl represented by $R_6$, $R_9$ is phenyl, $R_{10}$ and $R_{11}$ are members of the group consisting of phenyl-lower alkyl, monocyclic alkyl, lower alkenyl and lower alkynyl, $R_{12}$ is phenyl-lower alkyl, $R_{13}$ and $R_{14}$ are members of the group consisting of monocyclic alkyl, lower alkenyl and lower alkynyl, $R_{15}$ is lower alkyl, $R_{16}$, $R_{17}$ and $R_{18}$ are members of the group consisting of phenyl, phenyl-lower alkyl, monocyclic alkyl, lower alkenyl and lower alkynyl, $R_{19}$ is phenyl-lower alkyl, and $R_{20}$, $R_{21}$ and $R_{22}$ are members of the group consisting of phenyl, monocyclic alkyl, lower alkyl, lower alkenyl and lower alkynyl, and nontoxic acid addition salts, and nontoxic quaternary ammonium salts thereof derived from compounds in which the organic moiety is a member of the group consisting of lower alkyl, phenyl-lower alkyl and lower alkynyl groups.

Typical lower alkyl groups represented by $R_1$, $R_2$, $R_5$, $R_6$, $R_7$, $R_8$, $R_{15}$, $R_{20}$, $R_{21}$ and $R_{22}$ are methyl, ethyl, propyl, butyl, pentyl and hexyl.

Typical lower alkenyl groups represented by $R_1$, $R_2$, $R_7$, $R_8$, $R_{10}$, $R_{11}$, $R_{13}$, $R_{14}$, $R_{16}$, $R_{17}$ and $R_{18}$ are the allyl group and the 1-(2-butenyl) group.

Typical phenyl-lower alkyl groups represented by $R_1$, $R_2$, $R_7$, $R_8$, $R_{10}$, $R_{11}$, $R_{12}$, $R_{16}$, $R_{17}$, $R_{18}$ and $R_{19}$ are benzyl, phenylethyl, and phenylpropyl.

Although $R_1$, $R_2$, $R_7$, $R_8$, $R_9$, $R_{16}$, $R_{17}$, $R_{18}$, $R_{20}$, $R_{21}$ and $R_{22}$ are shown to represent phenyl, this is intended to include the nuclear substituted phenyl groups such as hydroxyphenyl, lower alkoxyphenyl groups such as methoxyphenyl, halophenyl groups such as chlorophenyl and lower acyloxyphenyl groups in which the acyloxy is from a lower aliphatic monocarboxylic acid such as acetoxyphenyl.

Typical monocyclic alkyl groups represented by $R_1$, $R_2$, $R_7$, $R_8$, $R_{10}$, $R_{11}$, $R_{13}$, $R_{14}$, $R_{16}$, $R_{17}$, $R_{18}$, $R_{20}$, $R_{21}$ and $R_{22}$ are the cyclopentyl and cyclohexyl groups.

Typical alkynyl groups represented by $R_1$, $R_2$, $R_7$, $R_8$, $R_{10}$, $R_{11}$, $R_{13}$, $R_{14}$, $R_{16}$, $R_{17}$, $R_{18}$, $R_{20}$, $R_{21}$ and $R_{22}$ are propynyl and butynyl.

Of especial importance for the uses hereinafter described are the compounds of the formula

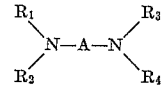

wherein $R_1$, $R_2$, $R_3$, $R_4$ and A have the significance hereinabove assigned, as well as the compounds

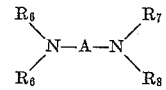

wherein $R_6$ and A have the significance assigned and $R_7$ and $R_8$ are lower alkyls, at least one of which is different than the lower alkyl represented by $R_6$.

The most important compounds of the group as hypotensive agents are those of the formula

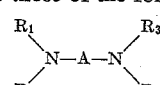

wherein A has the significance previously assigned, $R_1$ and $R_2$ are both lower alkyls, and

represents pyrrolidino, piperidino, 4-lower alkyl-piperazino, morpholino, 3-hydroxypiperidino and 1,2,3,4-tetrahydroisoquinolino.

Compounds of the above formulae are conveniently produced by reacting a mono N-(disubstituted aminoalkyl)-hydrazine with an N,N-disubstituted aminoalkyl aldehyde to produce an intermediate unsymmetrical N-(disubstituted aminoalkyl)-N'-(disubstituted aminoalkylidenyl)hydrazine and reducing the hydrazone to the corresponding hydrazine. This process may be represented as follows with particular regard to the production of the compounds having the groups represented by $R_1$, $R_2$, $R_3$ and $R_4$:

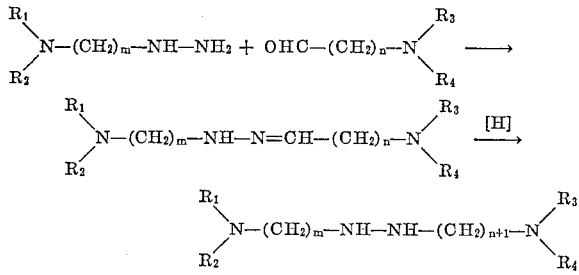

wherein $m$, $n$, $R_1$, $R_2$, $R_3$ and $R_4$ have the significance previously assigned. The other compounds with different substituents on the terminal nitrogens can be produced in the same way.

The amino N-(disubstituted aminoalkyl)hydrazines used as starting materials may be produced according to the processes shown in my copending application Serial No. 679,520, filed August 21, 1957, and now abandoned. Representative of such reactants are dimethylaminoethyl hydrazine, γ-di-isopropylaminobutyl hydrazine, pyrrolidinoethyl hydrazine, morpholinoethyl hydrazine, γ-(1-methyl-4-piperazino)-propyl hydrazine, β-(N-benzyl)-methylaminoethyl hydrazine, β-(N-o-chlorobenzyl)-methylaminoethyl hydrazine, β-(3-hydroxypiperidino)-ethyl hydrazine, β-(1,2,3,4-tetrahydroisoquinolino)-ethyl hydrazine and β-theophyllinoethyl hydrazine, N-allyl methylaminoethyl hydrazine, N-propargyl ethylaminopropyl hydrazine, N-cyclopentyl methylaminobutyl hydrazine, N-cyclohexenyl n-propylaminoethyl hydrazine, N-(p-methoxyphenyl)-isopropyl - N-β-phenethylaminobutyl hydrazine, N-o-chlorobenzyl-N-2-phenoxy-ethylaminoethyl hydrazine, N,N-dibenzylaminoethyl hydrazine, 2-[N-(2-chloroethyl)-N-methyl]-aminomethyl benzodioxan hydrazine, N-1-naphthylmethyl-N-ethylaminoethyl hydrazine, N-2-pyridyl-N-benzylaminoethyl hydrazine, N-2-pyridyl-N-p-methoxybenzylaminoethyl hydrazine, N-2-biphenyloxyethyl methylaminoethyl hydrazine, 2-indolinoethyl hydrazine, 3-indolinoisopropyl hydrazine, N-(p-hydroxyphenylisopropyl)-N-methylaminoethyl hydrazine, N-(m-methoxyphenylethyl)-N-methylaminoethyl hydrazine, N-2-pyrimidyl-N-methylaminopropyl hydrazine and the like.

Examples of the N-N-disubstituted aminoalkyl aldehydes and acetals thereof which may be used are dimethylaminoacetaldehyde,
diethylaminoacetaldehyde,
N-pyrrolidinoacetaldehyde,
N-morpholinoacetaldehyde,
N-1,2,3,4-tetrahydroisoquinolino-acetaldehyde,
N-isoindolino-acetaldehyde,
3-hydroxypiperidino-acetaldehyde,
N-4-hydroxypiperidinoacetaldehyde,
N-3-phenoxypiperidinoacetaldehyde,
diphenylaminopropionaldehyde,
dibenzylaminobutyraldehyde,
5-(N-phenyl-N-ethylamino)valeraldehyde,
8-morpholino caprylaldehyde,
dimethylaminoacetal,
diethylaminoacetal,
3-dimethylaminopropionaldehyde,
N-methyl-N-o-chlorobenzylaminoacetal,
pyrrolidino-acetal,
1-methyl-4-piperazinoacetal,
4-[N-p-methoxybenzyl-N-methylamino]-butyraldehyde,
N-propagryl ethylaminopropionaldehyde,
β-thiophyllino-acetaldehyde,
N-allyl methylaminoacetaldehyde,
diallylaminoacetaldehyde,
dicyclopentylaminobutyraldehyde,
dicyclohexylaminopropionaldehyde,
dibenzylaminoacetaldehyde,
N-1-naphthyl methyl-N-ethylaminoacetaldehyde,
N-2-pyridyl-N-benzylaminopropionaldehyde,
N-2-pyridyl-N-p-methoxybenzylaminobutyraldehyde,
N-2-biphenyloxyethyl methylaminoacetaldehyde,
3-indolylacetaldehyde,
3-indolylisopropionaldehyde,
N-(p-hydroxyphenylisopropyl)-N-methylaminoacetaldehyde,
N-(m-methoxyphenylethyl)-N-methylaminoacetaldehyde, and
N-2-pyrimidyl-N-methylaminobutyraldehyde.

Reaction of an N,N-(disubstituted aminoalkyl)-aldehyde with a mono-N-(disubstituted aminoalkyl)-hydrazine is conveniently effected by contacting the reactants, preferably equimolar quantities thereof, in the presence of water. The reaction proceeds at room temperature although slightly elevated temperatures may be employed to increase the rate of reaction. At room temperature, about 5 to 20 hours is adequate to substantially complete the reaction. Recovery of the desired aminoalkylidenyl hydrazine is conveniently achieved by conventional methods. Thus, the products, generally oils as the free base, may be salted out with an alkali metal hydroxide and extracted with a water immiscible organic solvent such as ether. The product is readily isolated by distillation under reduced pressure.

The N,N-disubstituted aminoalkyl aldehydes may be employed in the reaction as the free aldehydes or as the corresponding acetals. Acetals are preferably employed when the free aldehydes are not of significant stability. To achieve reaction when an acetal is used, a strong acid should be present in the reaction mixture to hydrolyze the acetal to the aldehyde in situ; the excess acid is neutralized prior to reaction with the hydrazine.

Among the N-(disubstituted aminoalkyl)-N'-(disubstituted aminoalkylidenyl)-hydrazines which are produced according to the described process are N-(2-pyrrolidinoethyl)-N'-(2-dimethylaminoethylidenyl)-hydrazine,
N-(2-piperidinoethyl)-N'-(2-dibutylaminopropylidenyl)-hydrazine,
N-(4-o-chlorobenzylmethylaminobutyl)-N'-(2-piperidinoethylidenyl)-hydrazine,
N-[2-(1,2,3,4-tetrahydroisoquinolino)ethyl]-N'-[2-(1-methyl-4-piperazine)-ethylidenyl]-hydrazine,
N-[3-(N-methyl-N-allyl)-aminopropyl]-N'-(2-isoindolinoethylidenyl)-hydrazine,
N-[2-(p-methoxybenzyl)methylaminoethyl]-N'-2-dimethylaminoethylidenyl)-hydrazine,
N-[2-(o-methylbenzyl)-methylaminoethyl]-N'-(2-dimethylaminoethylidenyl)-hydrazine,
N-(2-N-cyclohexyl-N-methylaminoethyl)-N'-(2-diethylaminoethylidenyl-hydrazine,
N-[(2'-benzodioxyl)-ethylaminoethyl]-N'-(2-dimethylaminoethylidenyl)-hydrazine,
N-(3-diallylaminopropyl)-N'-(4-dimethylaminobutylidenyl)-hydrazine,
N-(diphenylaminoethyl)-N'-(dibenzylaminoethylidenyl)-hydrazine,
N-dicyclohexylaminopentyl)-N'-(dipropargylaminobutylidenyl)-hydrazine,
N-(dipropylaminoethyl)-N'-(dimethylaminoethylidenyl)-hydrazine, N-(methylethylaminopropyl)-N'-(dipropylaminoethyl-
  idenyl)-hydrazine,
N-(morpholinoethyl)-N'-(piperidinopropylidenyl)-
  hydrazine,
N-(1,2,3,4-tetrahydroquinolinoethyl)-N'-(morpho-
  linoethylidenyl)-hydrazine,
N-[6-(3-hydroxypiperidinohexyl)]-N'-[2-(indolino-
  ethyl)]-hydrazine.
N-(2-theophyllinoethyl)-N'-(4-phenothiazinobutyl)-
  hydrazine and
N-(2-phenothiazinoethyl)-N'-(6-theophyllinohexyl)-
  hydrazine, and the like.

The N-(disubstituted aminoalkyl)-N'-(disubstituted aminoalkylidenyl)-hydrazines can be reduced to the corresponding hydrazines by use of a suitable reducing agent. Lithium aluminum hydride is the preferred reducing agent although others can be used such as catalytic hydrogenation. Catalytic processes, however, sometimes cleave the hydrazine bond. With lithium aluminum hydride, the reduction may be conveniently effected by intimately combining the reactants in an inert organic solvent such as anhydrous ether, dioxane and tetrahydrofuran. Elevated temperatures such as the reflux temperature enhance the reaction. At reflux temperature, from 1 to 8 hours is usually sufficient to substantially complete the reaction. After the reaction is terminated, water may be added to the mixture to decompose excess lithium aluminum hydride. To recover the product, the organic phase is separated and the aqueous residue extracted with the same solvent. The organic phase and extracts then may be combined, dried, and the product distilled.

Hydrazines, such as those from the hydrazones named above, may be formed in this way.

The unsymmetrical N,N'-(N,N-disubstituted aminoalkyl)-hydrazines can be substituted at the N or N'-position by suitable means. Thus, such compounds may be methylated by reaction with formaldehyde or an alkyl formate and subsequent reduction of the intermediate formyl group with a reducing agent to form a methyl group.

This reaction may be represented as follows with particular regard to the production of the compounds having the groups represented by $R_1$, $R_2$, $R_3$ and $R_4$:

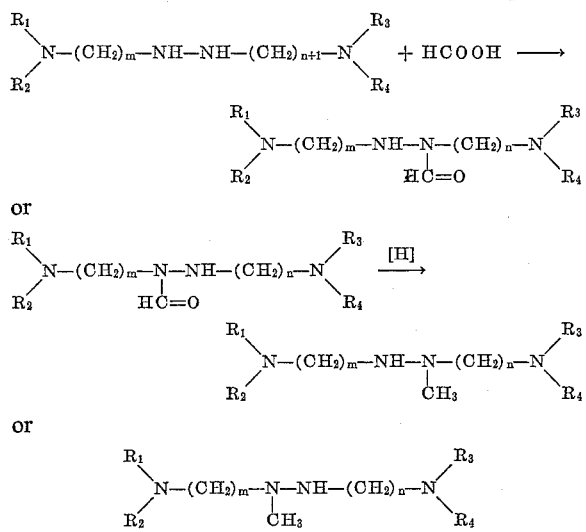

wherein $m$, $n$, $R_1$, $R_2$, $R_3$ and $R_4$ have the significance previously assigned. The other compounds with different substituents on the terminal nitrogens can be produced in the same way.

To effect the reaction the hydrazine may be added to an inert solvent such as ether or tetrahydrofuran, formaldehyde or an alkylformate such as ethyl formate, and then a reducing agent such as lithium aluminum hydride added to the mixture. In this way N-(2-dimethylamino- ethyl)-N'-(2-pyrrolidinoethyl)-hydrazine as well as the other hydrazines, may be methylated to form N-(2-dimethaminoethyl)-N or N'-methyl-N'-(2-pyrrolidinoethyl)-hydrazine.

Acid addition salts and quaternary ammonium salts of the hydrazones and hydrazines are also provided. By reacting a hydrazone or hydrazine with a mineral or organic acid an acid addition salt is produced. Acids such as hydrochloric, sulfuric, formic, acetic, citric, maleic, fumaric and phosphoric may be used to form salts. For each mole of base, there can be reacted 1 to 3 mole equivalents of acid.

Quaternary ammonium salts are readily produced by combining a hydrazine or hydrazone with a suitable alkylating agent such as an alkyl or aralkyl ester of an acid and particularly dimethyl sulfate, methyl chloride, ethyl bromide, methyl iodide, o-chlorobenzyl bromide, phenyl ethyl chloride, phenylpropyl bromide, benzyl chloride, propargyl chloride and equivalents thereof.

Both the acid addition salts and quaternary ammonium salts form at room temperature although slightly elevated temperatures may be used to increase the reaction. The salts precipitate readily from most organic solvents; some selection of solvent may be necessary but this is within the skill of the art.

The nontoxic bis-quaternary ammonium salts of the hydrazines are useful as ganglionic blocking agents while the nontoxic acid addition salts of the hydrazines are useful as diuretics. The onium salts also have hypotensive activity of long duration and thus can be used to lower blood pressure in animals. The compounds can be administered orally.

The free bases are also useful in the isolation and purification of penicillin with which they form salts.

The following examples are presented to illustrate, but not limit, the invention.

EXAMPLE 1

*N-Dimethylaminoethyl-N'-Pyrrolidinoethylidenyl Hydrazine*

A mixture containing 46.7 gm. (0.25 mole) of pyrrolidinoacetal and 250 gm. of concentrated hydrochloric acid was allowed to stand for 16 hours. The reaction mixture was concentrated to dryness in vacuo and the residue dissolved in 200 ml. of water. The pH of the solution was adjusted to 7 with 20% sodium hydroxide. A solution containing 20.6 gm. (0.2 mole) of 2-dimethylaminoethyl hydrazine was added to the above mixture and the resulting solution allowed to stand for 16 hours. The reaction mixture was made strongly alkaline with solid potassium hydroxide and the product extracted from the alkaline solution with ether. The ether extracts were dried with anhydrous potassium carbonate. The ether was removed by distillation and the product collected at 105° C. (0.9 mm.). Yield, 26.5 gm. (67%); $N_D^{20}$ 1.4936.

*Analysis.*—Calcd. for $C_{10}H_{22}N_4$: N, 14.13 (for 2 titratable nitrogen atoms). Found: N, 14.43.

EXAMPLE 2

*N-Dimethylaminoethyl-N'-Pyrrolidinoethyl Hydrazine*

To 3.4 gm. (0.09 mole) of lithium aluminum hydride in 200 cc. of dry ether was added a solution of 19.5 gm. (0.1 mole) of the ethylidene derivative produced as in Example 1 in 100 cc. of dry ether. The mixture was stirred at room temperature for 5 hours and the complex decomposed by the addition of 20 cc. of 40% potassium hydroxide solution. The ether layer was decanted, the solid residue washed repeatedly with additional ether and the combined ether extracts dried with potassium carbonate. The ether was removed by distillation and the product collected at 95–99° C. (0.8 mm.). Yield, 14.5 gm. (73%); $N_D^{20}$ 1.4870.

*Analysis.*—Calcd. for $C_{10}H_{24}N_4$: N (titratable), 13.98. Found: N, 14.12.

EXAMPLE 3

N-(3-Hydroxypiperidino)Ethyl-N'-Dimethyl-aminoethyl Hydrazine

This compound was prepared from 3-hydroxypiperidinoacetal and dimethylaminoethyl hydrazine by the procedure of Examples 1 and 2 with the exception that the ethylidene derivative was not purified by distillation but was reduced immediately in tetrahydrofuran; B.P. 145–150 (0.05 mm.). Yield, 55.4%; $N_D^{25}$ 1.5041.

Analysis.—Calcd. for $C_{11}H_{26}N_4O$: N (titratable), 18.24. Found: N, 14.47.

EXAMPLE 4

N-(3-Hydroxypiperidino)-Ethylidenyl-N'-Pyrrolidinoethyl Hydrazine

This compound was prepared from 3-hydroxypiperidinoaectal and pyrrolidinoethyl hydrazine as per Examples 1 and 2; B.P. 100° C. (0.3 mm.). Yield, 76%; $N_D^{25}$ 1.5111.

Analysis.—Calcd. for $C_{13}H_{25}N_4O$: N (titratable), 11.06. Found: N, 12.10.

EXAMPLE 5

N-(3-Hydroxypipeidino)Ethyl-N'-(Pyrrolidino-ethyl)Hydrazine

This compound was prepared from the ethylidene derivative in Example 4 by the procedure described in Example 2 except that tetrahydrofuran was used as a solvent for the reduction; B.P. 145–152 (0.08 mm). Yield, 51%; $N_D^{25}$ 1.5035.

Analysis.—Calcd. for $C_{13}H_{28}N_4O$: N (titratable) 16.38. Found: N, 15.49.

EXAMPLE 6

N-(3-Hydroxypiperidino)Ethyl-N'-(Morpholino-ethyl)Hydrazine

This compound was prepared from 3-hydroxypiperidine acetal and 2-morpholino ethyl hydrazine by the procedure described in Examples 1 and 2 except that tetrahydrofuran was used as a solvent for the reduction; B.P. 63–68° C. (0.003 mm.). Yield, 32%; $N_D^{25}$ 1.4920.

Analysis.—Calcd. for $C_{13}H_{28}N_4O_2$: N (titratable), 15.42. Found: N, 15.68.

EXAMPLE 7

N-(3-Hydroxypiperidino)Ethyl-N'-(1-Methyl-4-Piperazino-Ethyl)Hydrazine

This compound was prepared from 3-hydroxypiperidino acetal and 1-methyl-4-piperazinoethyl hydrazine by the procedure described in Examples 1 and 2 using tetrahydrofuran as a solvent for the reduction of the ethylidene derivative; B.P. 150–153 (0.05 mm.). Yield 52%; $N_D^{25}$ 1.5137.

Analysis.—Calcd. for $C_{14}H_{31}N_5O$: N (titratable), 19.64. Found: N, 16.79.

EXAMPLE 8

N-Dimethylaminoethyl-N'-(1,2,3,4-Tetrahydro-isoquinolino)Ethyl Hydrazine

This compound was prepared from dimethylaminoacetal and 1,2,3,4-tetrahydroisoquinolinoethyl hydrazine in the manner described in Examples 1 and 2; B.P. 150° C. (1.2 mm.). Yield, 6%; $N_D^{20}$ 1.5572.

Analysis.—Calcd. for $C_{15}H_{26}N_4$: N (titratable), 10.68. Found: N, 10.89.

EXAMPLE 9

The following compounds were also prepared by the described procedures:

$$Am_1(CH_2)_mNHNH(CH_2)_nAm_2$$

| Compound | $Am_1$ | $Am_2$ | $m$ | $n$ | $N_D^{20}$ | B.P., °C./mm. | Percent N Calcd. | Percent N Found |
|---|---|---|---|---|---|---|---|---|
| 1 | ⬡N— | $NMe_2$ | 2 | 2 | 1.4870 | 95/0.7 | 13.98 | 14.12 |
| 2 | $Et_2N$ | $NMe_2$ | 2 | 2 | 1.4624 | 76/0.06 | 13.84 | 13.81 |
| 3 | O⬡N— | $NMe_2$ | 2 | 2 | 1.4874 | 105/0.025 | 12.95 | 12.99 |
| 4 | φCH₂N—, CH₃ | $NMe_2$ | 2 | 2 | 1.5191 | 125/0.09 | 11.19 | 11.18 |
| 5 | ⬡N—, CH₃ | $NEt_2$ | 2 | 2 | 1.4836 | 100/0.02 | 12.27 | 12.08 |
| 6 | ⬡N—, CH₃ | $NMe_2$ | 2 | 2 | 1.4805 | 85–90/0.03 | 12.27 | 12.21 |
| 7 | H₃C—N⬡N— | $NMe_2$ | 2 | 2 | 1.4910 | 106–116/0.09 | 12.21 | 11.99 |
| 8 | ⬠N— | $NMe_2$ | 2 | 2 | 1.4843 | 92–99/0.25 | 13.07 | 12.90 |
| 9 | $Me_2N$— | $NMe_2$ | 2 | 3 | | | | |

EXAMPLE 10

N-(Dimethylaminoethyl)-N'-(Piperidino-ethyl) Hydrazine Dimethiodide

To a solution containing 5.7 gm. (0.04 mole) of methyl iodide in 20 ml. of acetone was added 2.14 gm. (0.01 mole) of the base. The mixture was refrigerated and the acetone decanted from the insoluble oil. Crystallization occurred following the addition of 30 ml. of ethyl alcohol. The product was isolated by filtration and washed with an ether-alcohol mixture. Yield, 2.27 gm. (45.6%); M.P. 144–146° C.

Analysis.—Calcd. for $C_{13}H_{32}I_2N_4$: N (titratable) 5.62; I, 50.74. Found: N, 5.43; I, 50.37.

EXAMPLE 11

N-Dimethylaminoethyl-N'-2[4-(1-Methyl)-Piperazino]Ethyl Hydrazine Trimaleate To a solution of 4.64 gm. (0.04 mole) of maleic acid in 30 ml. of absolute ethanol was added a solution containing 2.29 gm. (0.01 mole) of the base in 30 ml. of anhydrous ether. The white solid was isolated by filtration and washed with 1:1 ethanol-ether; yield, 5.31 g. The solid was triturated with 25 ml. of warm absolute ethanol and the mixture refrigerated. The purified solid was isolated by filtration. Yield, 5.15 g. (89%); M.P. 117–120° C.

Analysis.—Calcd. for $C_{23}H_{39}N_5O_{12}$: N (titratable), 7.33. Found: N, 7.52. Maleic acid content calcd.: 60.29. Found 60.13.

EXAMPLE 12

N - (3 - Hydroxypiperidino)Ethyl - N' - Morpholinoethyl Hydrazine Trimaleate A trimaleate salt was prepared in 1:1 ethanol-ether. Yield, 75%; M.P. 115–117.

Analysis.—Calcd. for $C_{25}H_{40}N_4O_{14}$: N (titratable), 6.77. Neutral equiv.: 103. Found: N, 6.97; N.E. 100.

EXAMPLE 13

N - (3 - Hydroxypiperidinoethyl) - N' - (1 - Methyl - 4 - Piperazinoethyl) Hydrazine Tetramaleate The tetramaleate salt was prepared in absolute ethanol; M.P. 110–115° C. (dec.). Yield, 76%.

Analysis.—Calcd. for $C_{30}H_{47}N_5O_{17}$: N, 7.48. Neutral equiv.: 93.7. Found: N, 7.29. Neutral equiv. 93.1.

EXAMPLE 14

N - (2 - Dimethylaminoethyl) - N - Formyl - N'-(Pyrrolidinoethyl) Hydrazine

A mixture containing 32 gm. of N-(dimethylaminoethyl)-N'-(pyrrolidinoethyl) hydrazine and 120 gm. of ethyl formate was refluxed for 24 hours. The product was isolated by fractional distillation; B.P. 127–129° C. (0.6 mm.); $N_D^{20}$ 1.4950. Yield, 14.9 g. (41%).

Analysis.—Calcd. for $C_{11}H_{24}N_4O$: N (titratable), 12.27. Found: N, 12.00.

EXAMPLE 15

N - (Dimethylaminoethyl) - N - Methyl - N'-Pyrrolidinoethyl) Hydrazine

The formyl derivative of Example 14 was reduced with lithium aluminum hydride in anhydrous ether as described in Example 2; B.P. 83° C. (0.25 mm.); $N_D^{20}$ 1.4735. Yield, 72%.

Analysis.—Calcd. for $C_{11}H_{26}N_4$: N (titratable), 13.07. Found: N, 13.33.

The trimaleate salt was prepared in a mixture of ethanol and ether; M.P. 138° C.

Analysis.—Calcd. for $C_{23}H_{38}N_4O_{12}$: N (titratable), 7.47. Maleic acid content, 61.89. Found: N, 7.25. Maleic acid content, 61.53.

EXAMPLE 16

Methiode salts of some of the compounds of Example 9 were also prepared and the following data obtained:

| Compound | M.P. ° C. | Percent N | | Percent I | |
|---|---|---|---|---|---|
| | | Calcd. | Found | Calcd. | Found |
| 1 | 159–161 | 5.79 | 5.92 | 52.42 | 52.50 |
| 2 | 165–166 | 5.76 | 5.88 | 52.20 | 52.54 |
| 3 | 96 | 5.07 | 4.69 | 45.96 | 44.98 |
| 4 | | | | | |
| 5 | 147 | 5.47 | 5.37 | 49.55 | 49.22 |
| 6 | 155–158 | 5.45 | 5.25 | 49.35 | 47.76 |
| 7 | [1] 93–99 | 8.18 | 7.91 | 49.45 | 47.94 |
| 8 | 144–146 | 5.62 | 5.43 | 50.94 | 50.37 |
| 9 | | | | | |

[1] Very hygroscopic.

EXAMPLE 17

Maleate salts of some of the compounds of Example 9 were also prepared and the following data obtained:

| Compound | M.P. ° C. | Percent N | | Percent maleic acid | |
|---|---|---|---|---|---|
| | | Calcd. | Found | Calcd. | Found |
| 1 | 119–120 | 7.66 | 7.85 | 63.47 | 65.16 |
| 2 | 92–94 | 7.63 | 7.49 | 63.24 | 63.40 |
| 3 | 94–95 | 7.45 | 7.17 | 61.67 | 61.69 |
| 4 | 126–129 | 7.02 | 7.15 | 58.16 | 60.20 |
| 5 | | | | | |
| 6 | | | | | |
| 7 | 117–120 | 7.33 | 7.52 | 60.29 | 60.13 |
| 8 | 107–111 | 7.47 | 7.62 | 61.90 | 64.70 |
| 9 | | | | | |

Various changes and modifications of the invention can be made and, to the extent that such variations incorporate the spirit of this invention, they are intended to be included within the scope of the appended claims.

What is claimed is:
1. A member of the group consisting of compounds of the formulae

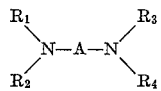

wherein A is a member of the group consisting of

and

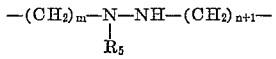

wherein $m$ is an integer from 2 to 10, $n$ is an integer from 1 to 9, $R_1$ and $R_2$ are lower alkyl,

represents a member of the group consisting of pyrrolidino, piperidino, 4-lower alkyl-piperazino, morpholino, 3-hydroxypiperidino and 1,2,3,4-tetrahydroisoquinolino, and $R_5$ is a member of the group consisting of hydrogen and lower alkyl groups, and nontoxic pharmaceutically acceptable acid addition salts thereof.

2. N - dimethylaminoethyl - N' - pyrrolidinoethyl hydrazine.

3. N - (3 - hydroxypiperidino)ethyl - N' - dimethylaminoethyl hydrazine.

4. N - (3 - hydroxypiperidino)ethyl - N' - morpholinoethyl hydrazine.

5. N - (3 - hydroxypiperidino)ethyl - N' - (1 - methyl-4-piperazinoethyl)hydrazine.

6. N - dimethylaminoethyl - N' - (1,2,3,4 - tetrahydroisoquinolino)ethyl hydrazine.

7. N - diethylaminoethyl - N' - pyrrolidinoethyl hydrazine.

8. N - dimethylaminoethyl - N' - morpholinoethyl hydrazine.

References Cited in the file of this patent
UNITED STATES PATENTS

| | | |
|---|---|---|
| 2,830,050 | Biel | Apr. 8, 1958 |
| 2,948,731 | De Stevens | Aug. 9, 1960 |
| 2,951,078 | Biel | Aug. 30, 1960 |